United States Patent
Fleck et al.

[11] Patent Number: 6,154,196
[45] Date of Patent: Nov. 28, 2000

[54] COORDINATE INPUT DEVICE CONVERTIBLE BETWEEN RIGHT-HANDED AND LEFT-HANDED MODES

[75] Inventors: David C. Fleck; Konrad W. Pollmann, both of Vancouver; Scott Rawlings, Camas, all of Wash.; Jan Hippen, Portland, Oreg.; David Sayler, Portland, Oreg.; I-Chiang Sun, Portland, Oreg.; Yasuyuki Fukushima, Ibaraki-ken; Masaki Niwa, Saitama-ken, both of Japan

[73] Assignee: Wacom Co., Ltd., Japan

[21] Appl. No.: 09/092,899

[22] Filed: Jun. 8, 1998

[51] Int. Cl.⁷ ...................................................... G09G 5/08
[52] U.S. Cl. ........................................... 345/157; 345/156
[58] Field of Search ................................... 345/157, 163, 345/145, 156

[56] References Cited

U.S. PATENT DOCUMENTS

| | | |
|---|---|---|
| 4,878,553 | 11/1989 | Yamanami et al. . |
| 5,004,871 | 4/1991 | Purcell . |
| 5,014,044 | 5/1991 | Murray . |
| 5,028,745 | 7/1991 | Yamanami et al. . |
| 5,055,831 | 10/1991 | Padula . |
| 5,061,828 | 10/1991 | Purcell . |
| 5,109,141 | 4/1992 | Purcell . |
| 5,111,005 | 5/1992 | Smith et al. . |
| 5,506,605 | 4/1996 | Paley . |
| 5,682,019 | 10/1997 | Katsurahira et al. . |
| 5,701,141 | 12/1997 | Schmenk et al. ........................ 345/157 |
| 5,714,984 | 2/1998 | Fukuzaki et al. . |
| 5,717,435 | 2/1998 | Fukushima et al. . |
| 5,731,801 | 3/1998 | Fukuzaki . |
| 5,731,807 | 3/1998 | Feierbach . |
| 5,734,377 | 3/1998 | Fukuzaki . |
| 5,798,752 | 9/1998 | Buxton et al. ........................... 345/146 |
| 5,864,334 | 1/1999 | Sellers ..................................... 345/168 |

FOREIGN PATENT DOCUMENTS

| | | |
|---|---|---|
| 0 607 694 | 7/1994 | European Pat. Off. . |
| 0 762 318 | 3/1997 | European Pat. Off. . |
| 296 19 374 | 2/1997 | Germany . |
| 297 10 567 | 10/1997 | Germany . |
| 63-136124 | 6/1988 | Japan . |
| 64-27729 | 2/1989 | Japan . |
| 273418 | 3/1990 | Japan . |
| 2162410 | 6/1990 | Japan . |
| 2292617 | 12/1990 | Japan . |
| 3189716 | 8/1991 | Japan . |

OTHER PUBLICATIONS

Reexamination Certificate B1 4,878,553, Yamanami, et. al., Sep. 16, 1997.

U.S. Ser. No. 08/840,617, Filed Apr. 30, 1997 Now patent #6005555.

U.S. Ser. No. 08/712,052, Filed Sep. 10, 1996 Now patent #5898136.

U.S. Ser. No. 08/880,285, Filed Jun. 24, 1997 Now abandoned.

U.S. Ser. No. 08/870,712, Filed Jun. 6, 1997 Now Examining.

U.S. Ser. No. 08/806,160, Filed Feb. 25, 1997 Now Patent #5969296.

U.S. Ser. No. 08/917,891 Now Examining.

*Primary Examiner*—Richard A. Hjerpe
*Assistant Examiner*—Ronald Laneau
*Attorney, Agent, or Firm*—Liniak, Berenato, Longacre & White, LLC

[57] ABSTRACT

A coordinate input device (e.g. mouse-like device or cursor-like device) includes an outer housing which is movable between a first position adapted for use by right-handed users, and a second position adapted for use by left-handed users. In such a manner, the coordinate input device is easily utilized by both right and left-handed users. In certain embodiments, a rotatable thumb or finger wheel may be provided in the coordinate input device for manipulation by the user in order to adjust a parameter of an image being written/drawn on a corresponding display screen by the coordinate input device.

19 Claims, 17 Drawing Sheets

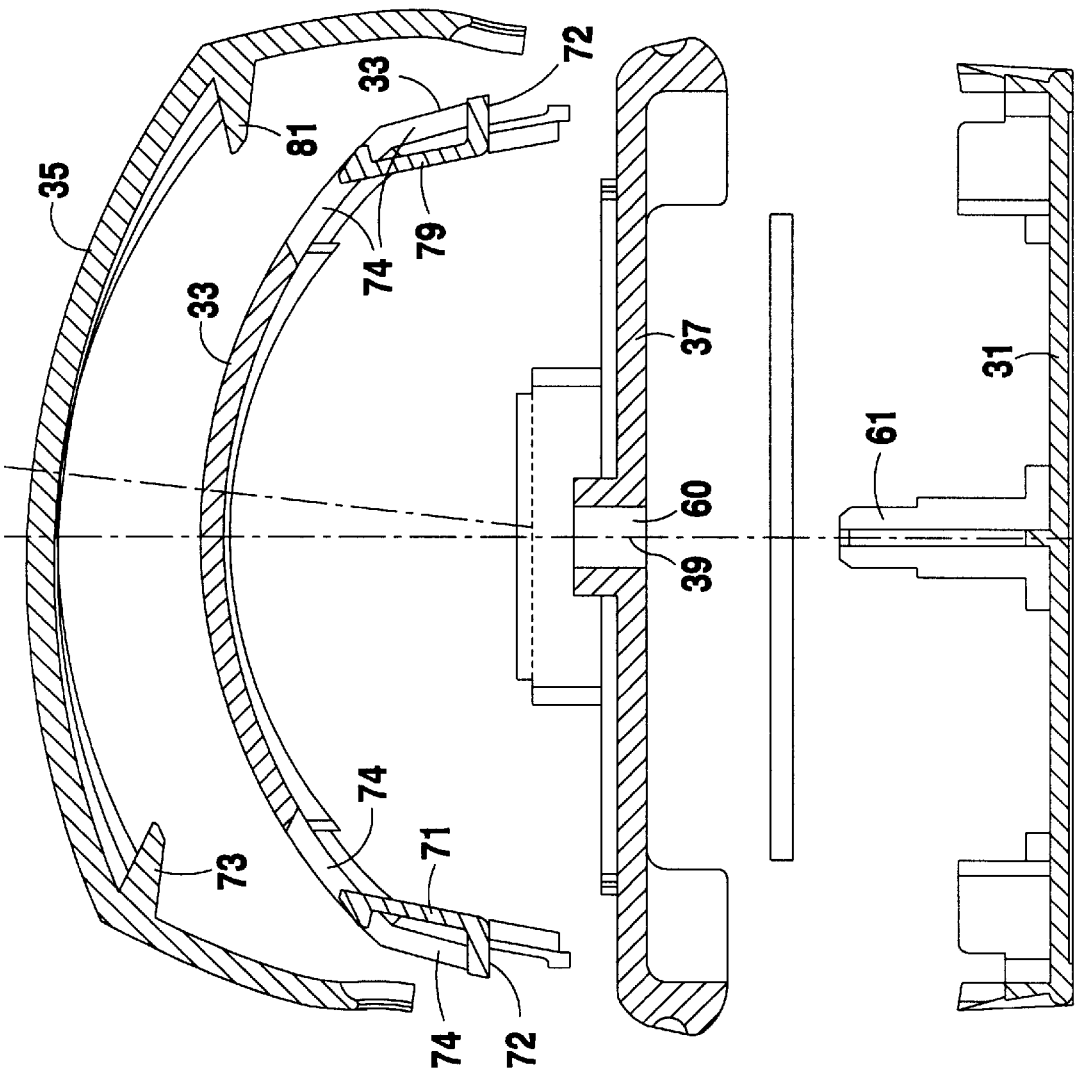

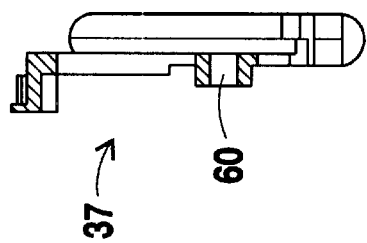
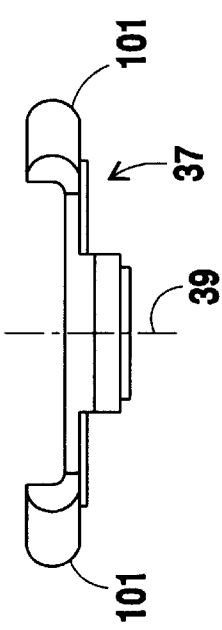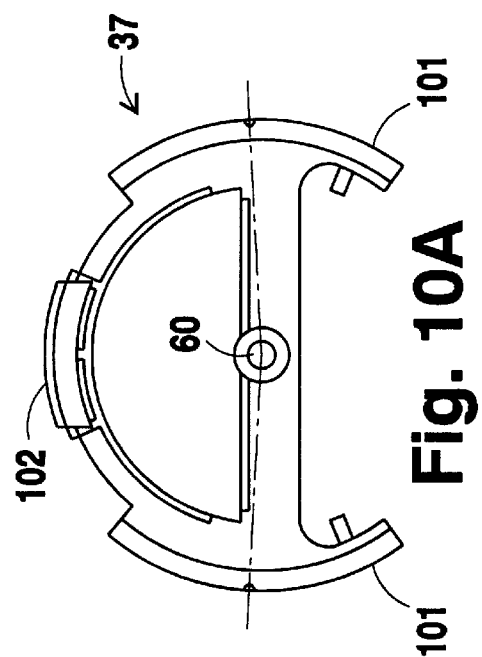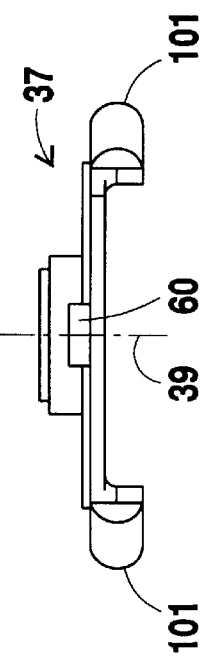
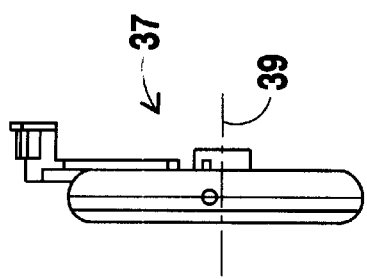

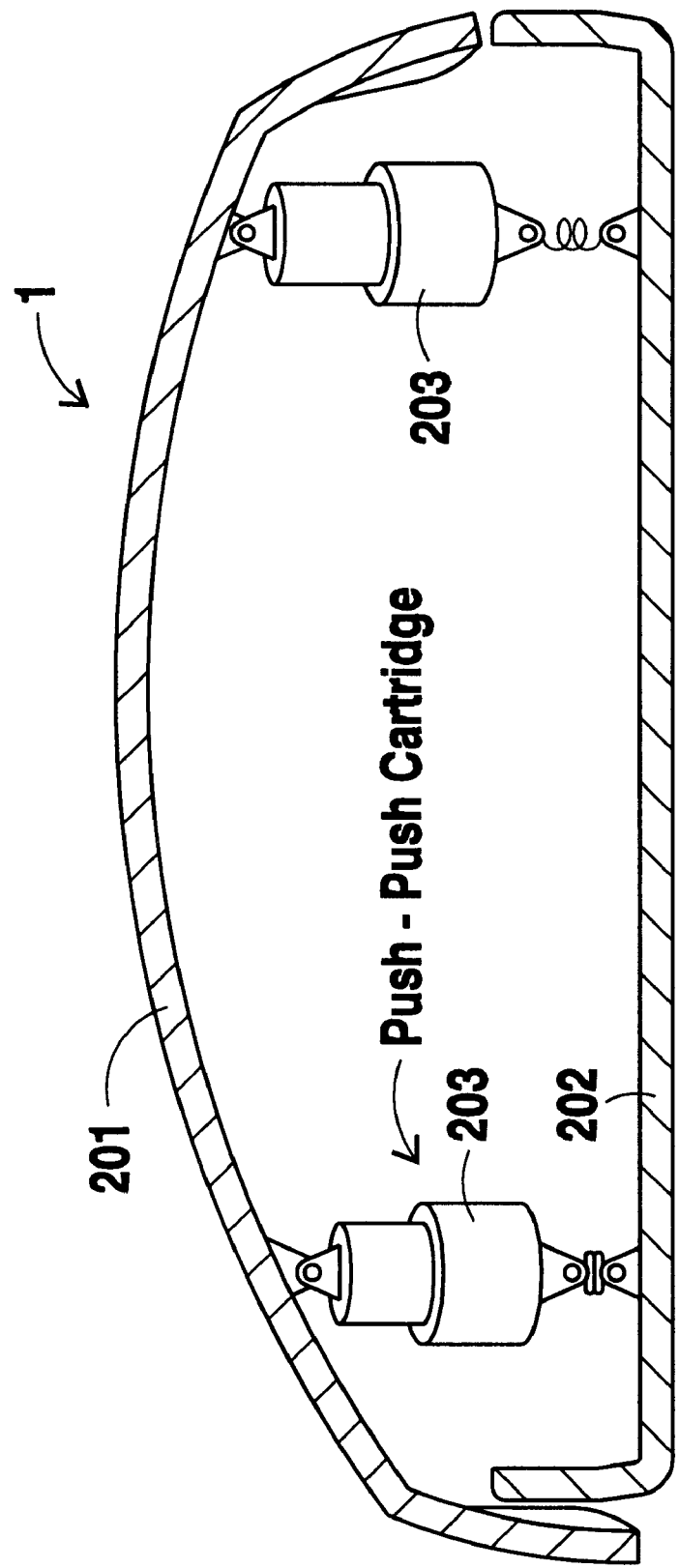

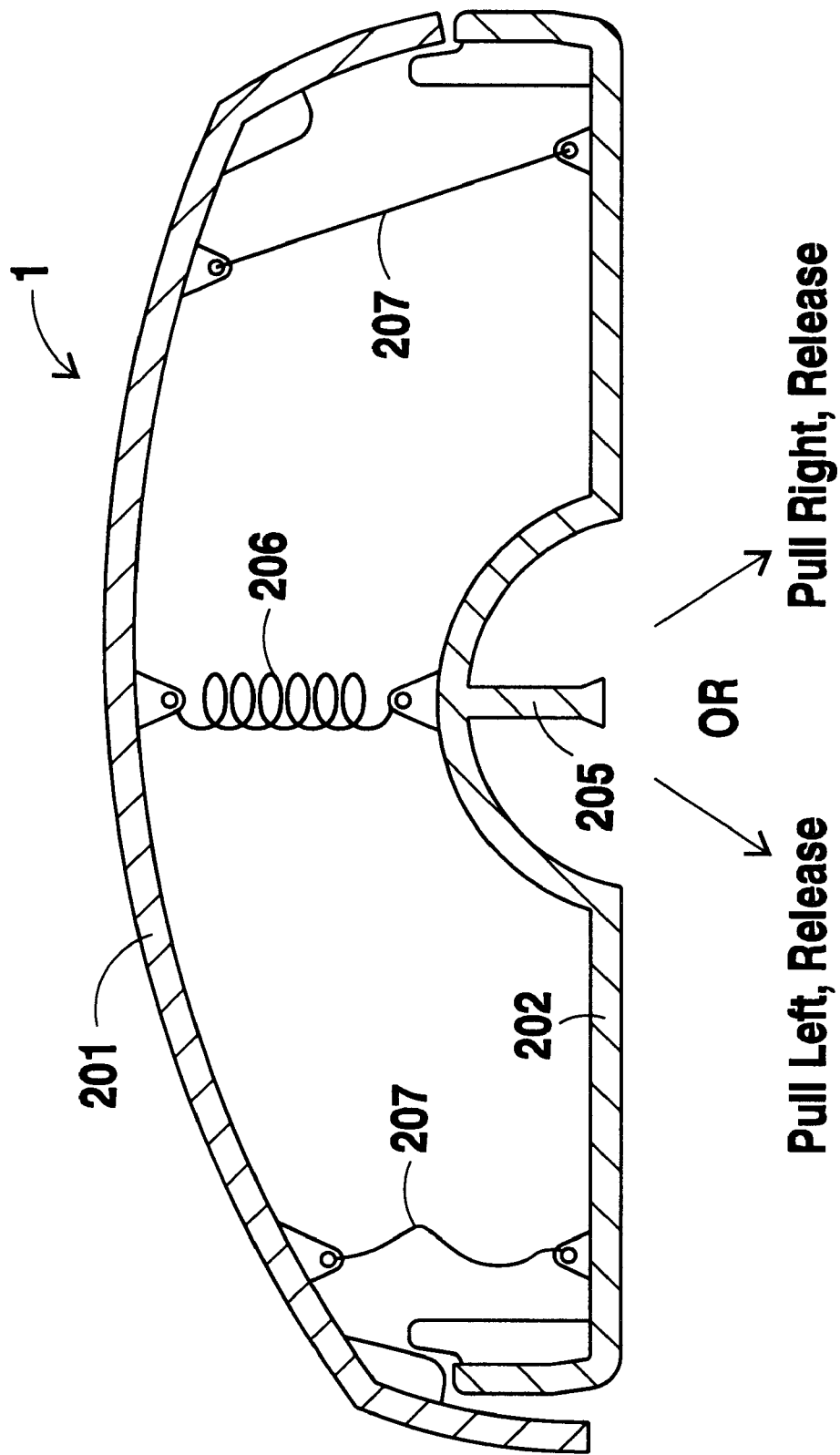

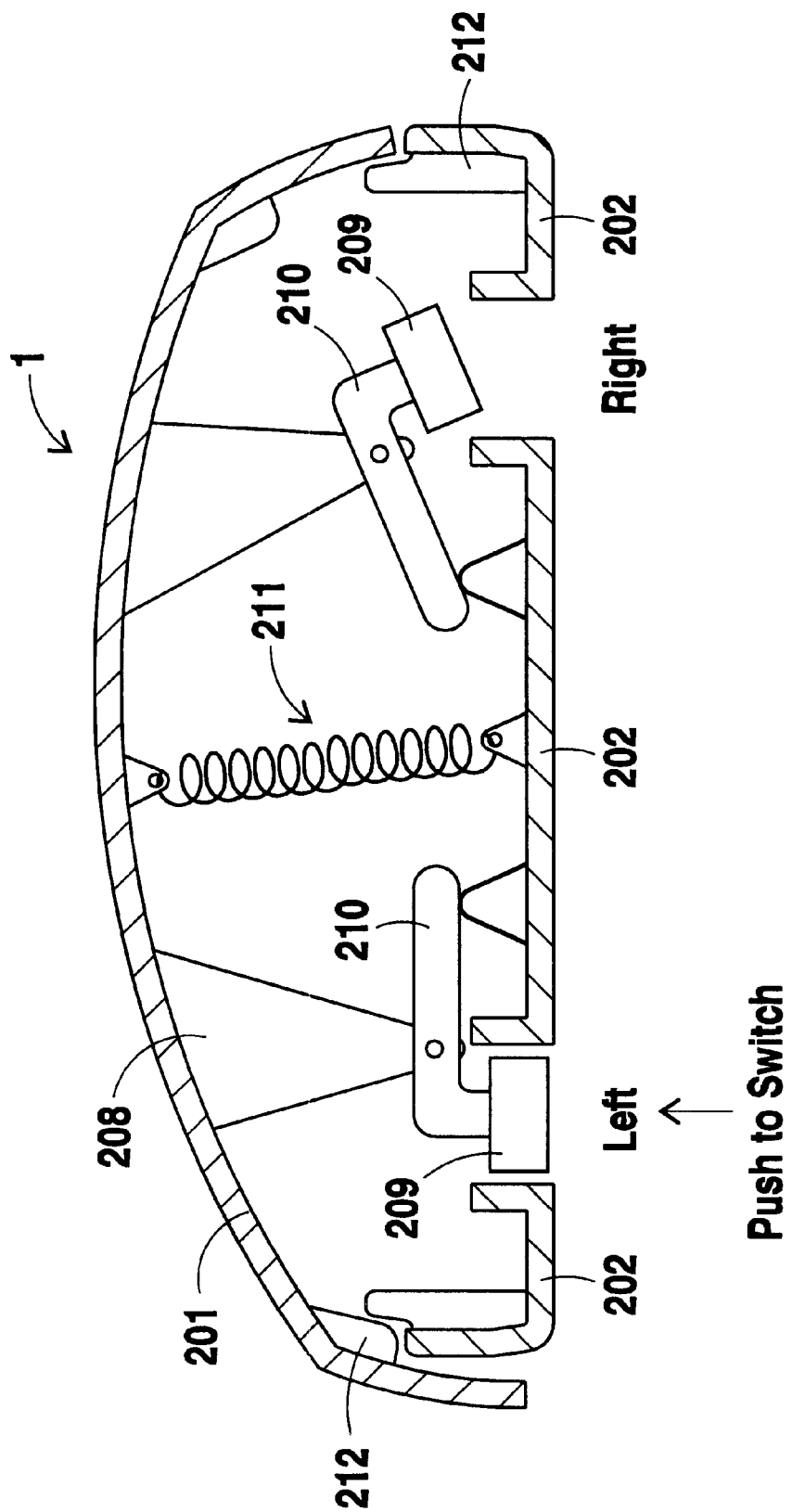

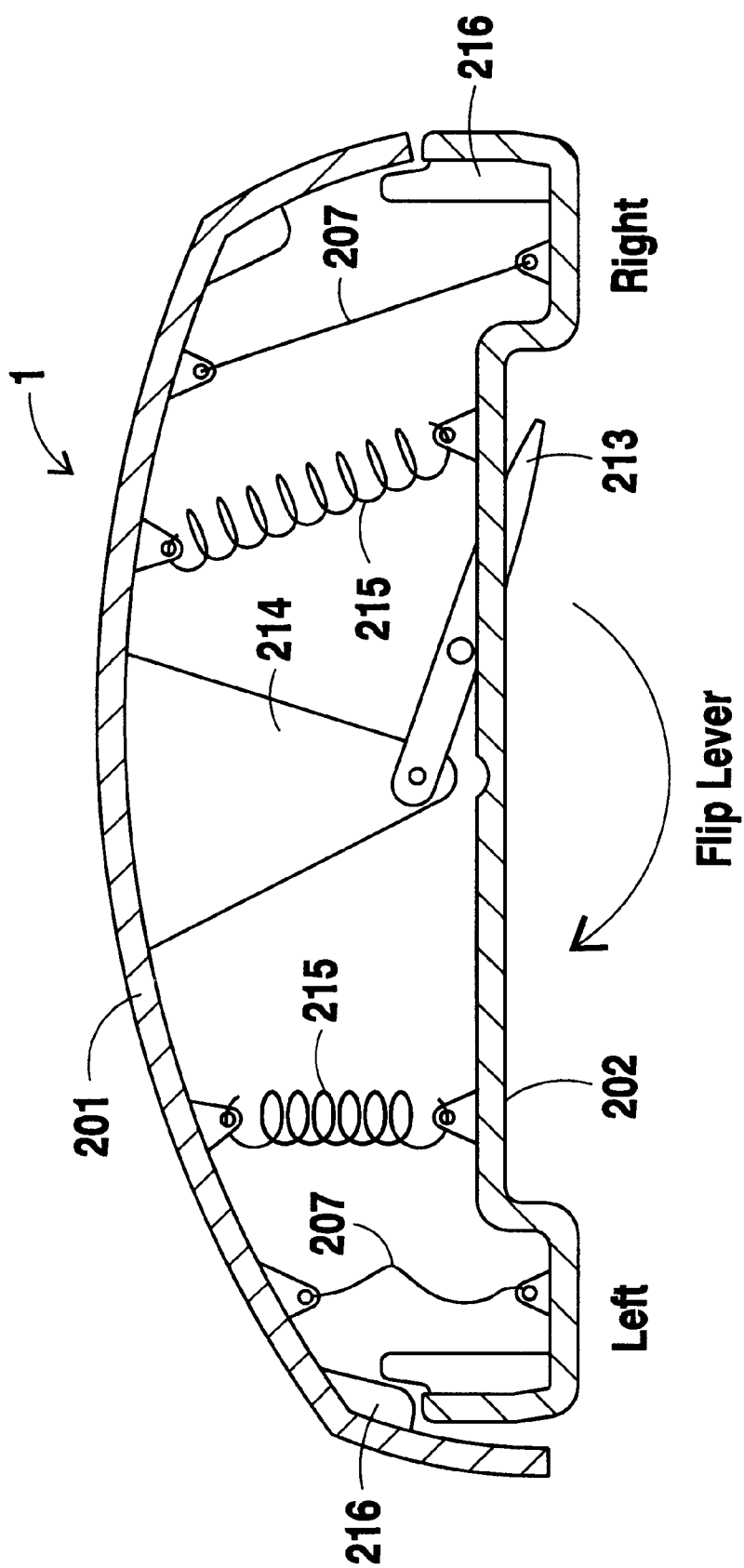

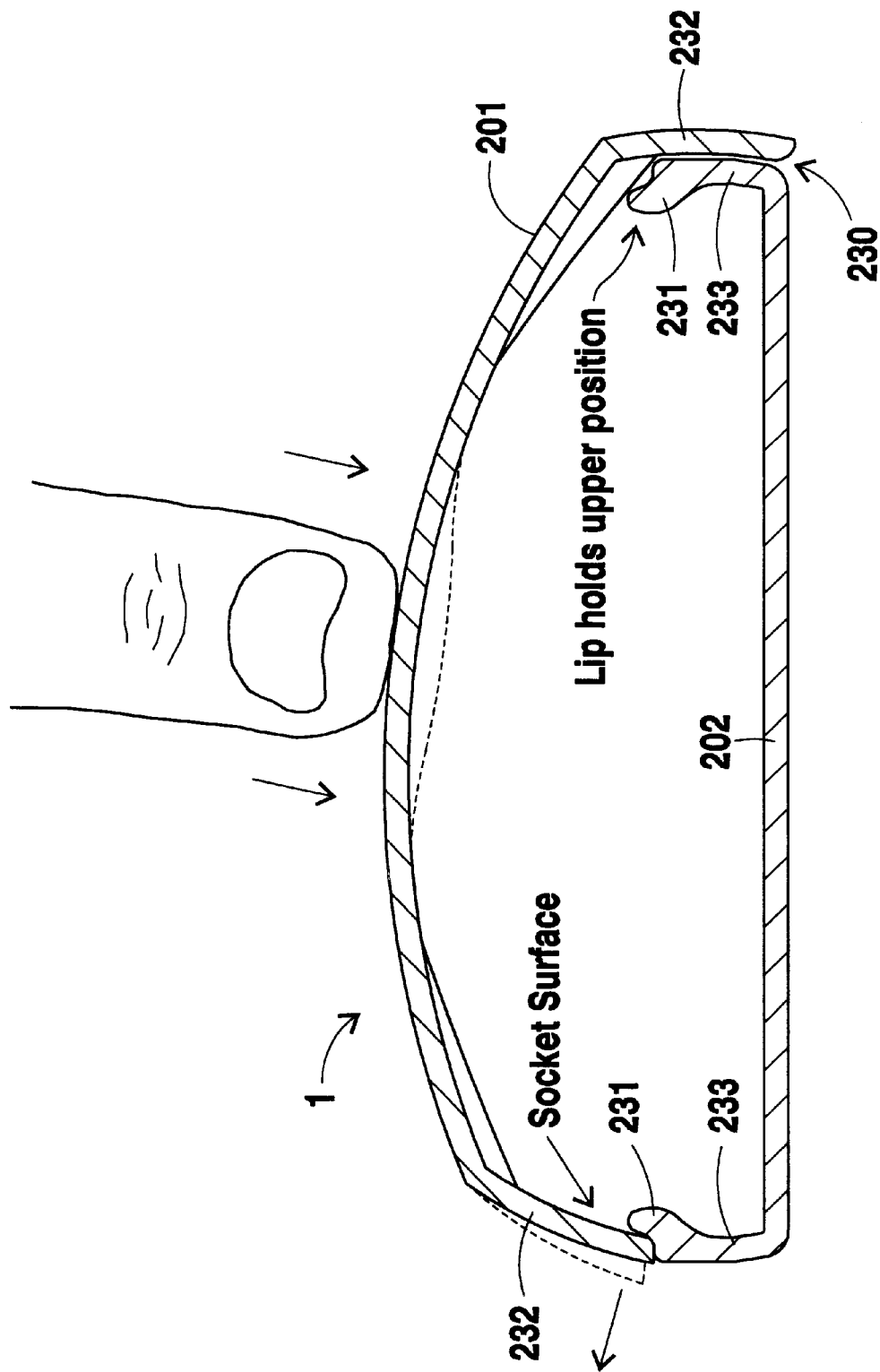

COORDINATE INPUT DEVICE CONVERTIBLE BETWEEN RIGHT-HANDED AND LEFT-HANDED MODES

RELATED APPLICATION

This application is related to U.S. application Ser. No. 08/870,712, filed Jun. 6, 1997, the disclosure of which is incorporated herein by reference.

This invention relates to a coordinate input device for use with a digitizer or other computer coordinate input system. More particularly, this invention relates to a mouse-like or cursor-like coordinate input device which is convertible between right-handed and left-handed mode positions.

BACKGROUND OF THE INVENTION

Mouse-like and cursor-like coordinate input devices are known in the art. For example, see U.S. Pat. Nos. 5,731,807; 5,055,831; 5,111,005; and 5,014,044, the disclosures of which are hereby incorporated herein by reference.

Many computer or graphics tablet users are right-handed, while others are left-handed. Unfortunately, many of the aforementioned patents disclose input devices which are uncomfortable for left-handed and/or right-handed users to operate, and are not comfortable for use by both. Many prior art mouse and cursor devices have only a single mode, and do not take into account potential use by both right and left handed users.

It is apparent from the above that there exists a need in the art for a computer input device (e.g. mouse or cursor) which includes different operational position modes for right and left handed users. In other words, there exists a need in the art for an input device that includes at least one positional mode for right-handed users and another positional mode for left-handed users, so that the device is ergonomically pleasing to both types of users.

SUMMARY OF THE INVENTION

Generally speaking, this invention fulfills the above-described needs in the art by providing a coordinate input device for movement over a generally flat surface; and an adjustable shell or movement relative to a base between a right-handed mode position and a left-handed mode position wherein the right-handed mode position is adapted for use by right-handed users and the left-handed mode position is adapted for use by left-handed users.

In certain preferred embodiments, the shell moves along an arc between the right-handed and left-handed mode positions.

In additional preferred embodiments, the input device is approximately mouse-like in shape, and may be used in conjunction with a digitizer tablet to input coordinate information relating to an image being drawn on a corresponding display.

This invention further fulfills the above-described needs in the art by providing a coordinate input device moveable along a generally horizontal surface in order to input coordinate information to a corresponding computer, the coordinate input device comprising:

a base for movement along the generally horizontal surface;

an inner shell affixed in a non-moving relation to said base, at least a portion of the inner shell generally shaped in an arc above a portion of the base; and an outer shell moveable relative to the inner shell, along an arc, between a left-handed mode position adapted for use by left-handed users and a right-handed mode position adapted for use by right-handed users.

This invention will now be described with respect to certain embodiments thereof, accompanied by certain illustrations, wherein:

IN THE DRAWINGS

FIG. 9 is an exploded view of the FIG. 5 coordinate input device.

FIGS. 10(a), 10(b), 10(c), 10(d), and 10(e) are various views of finger wheel/dial 37.

FIG. 11 is a side cross sectional view of a coordinate input device according to another embodiment of this invention.

FIG. 12 is a side cross sectional view of a coordinate input device according to another embodiment of this invention.

FIG. 13 is a side cross sectional view of a coordinate input device according to another embodiment of this invention.

FIG. 14 is a side cross sectional view of a coordinate input device according to another embodiment of this invention, including a flip lever for moving the outer shell between its left and right handed mode positions.

Figure 15:
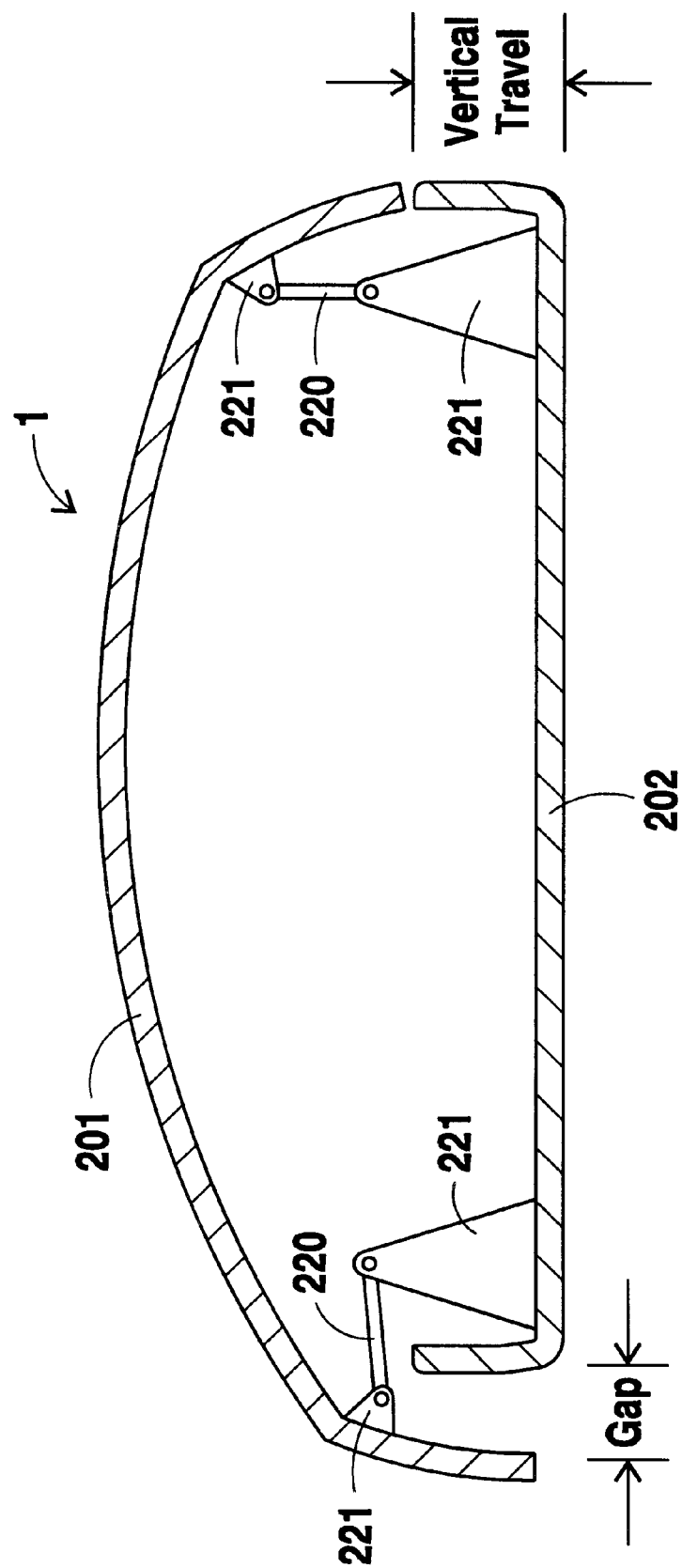

FIG. 15 is a side cross sectional view of a coordinate input device according to another embodiment of this invention.

Figure 16:
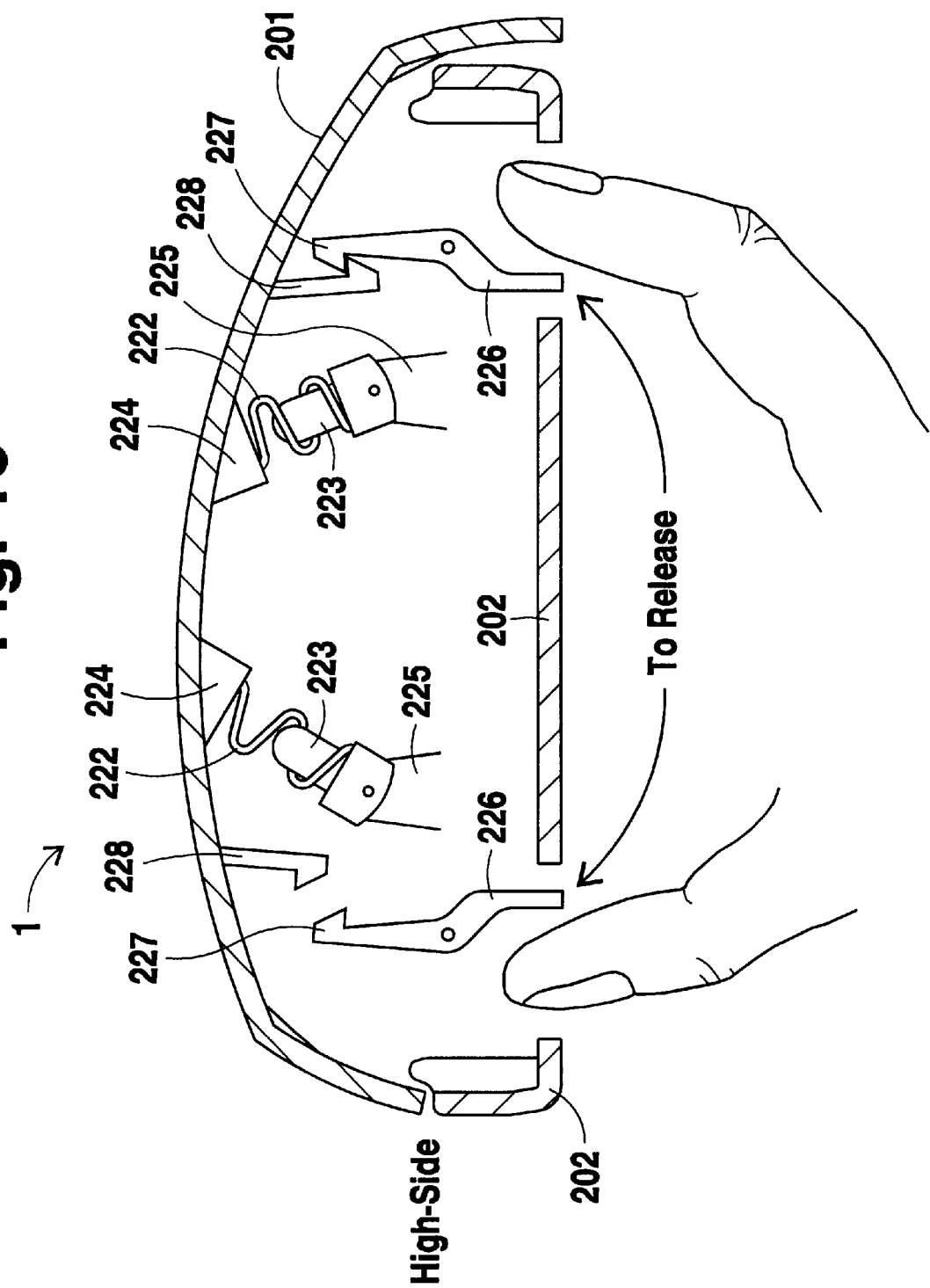

FIG. 16 is a side cross sectional view of a coordinate input device according to another embodiment of this invention, including a pair of release levers with latches for enabling the outer shell to be moved between the left and right handed mode positions.

FIG. 17 is a side cross sectional view of a coordinate input device according to another embodiment of this invention, wherein pressure applied by the user is utilized to move the outer shell between left and right handed mode positions.

DETAILED DESCRIPTION OF CERTAIN EMBODIMENTS OF THIS INVENTION

Referring now more particularly to the accompanying drawings in which like reference numerals indicate like parts throughout the several views.

Coordinate input devices according to this invention are mouse-like and/or cursor-like in nature and shape, and are adapted for movement over and along a generally flat work surface. Coordinate input devices herein may be used in conjunction with graphics digitizer tablets, conventional mouse pads which form the work surface, or with any other type of known coordinate input surface upon which the input device can be manipulated.

Coordinate input devices described herein have both a left-handed mode or operational position designed for use by left-handed users, and a right-handed mode or operational position designed for use by right-handed users. Typically, it is anticipated that the user's left-hand is adapted to hold the coordinate input device in left-handed modes, and the user's right hand adapted to hold the coordinate input device in right-handed modes. According to certain embodiments of this invention, the coordinate input device includes a housing (e.g. outer shell) which is switchable between a left-handed mode position and a right-handed mode position, so that the same coordinate input device is easily adaptable for use by either right-handed or left-handed users.

Figure 1:
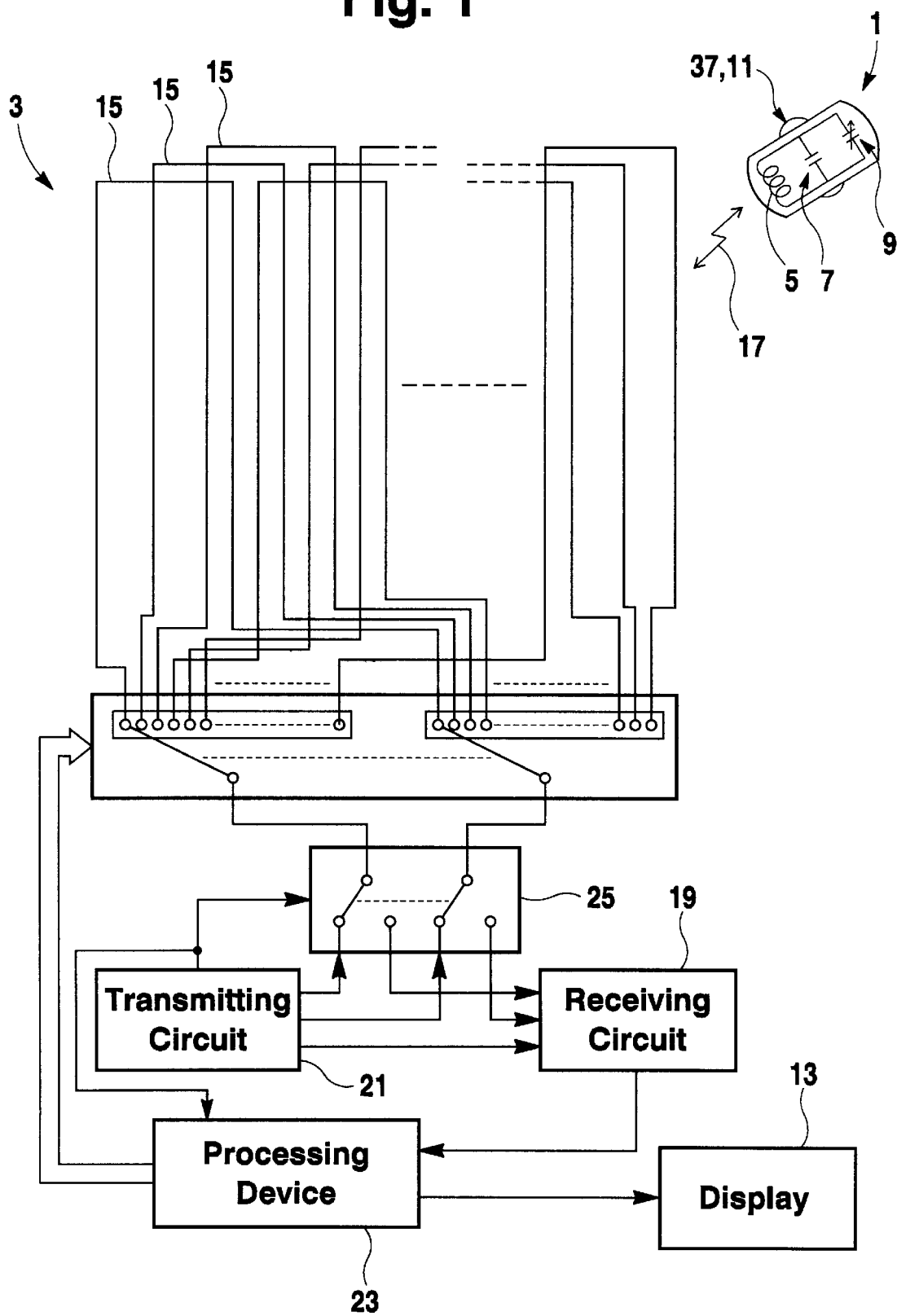
FIG. 1 is a schematic diagram illustrating a coordinate input device according to an embodiment of this invention being used in conjunction with a digitizer tablet, this tablet being usable in conjunction with any of the coordinate input devices described herein.

FIG. 1 is a schematic diagram illustrating coordinate input device 1 being used in conjunction with a digitizer graphics tablet system 3. As illustrated, coordinate input device 1 includes a tuning circuit therein having inductive coil 5, capacitor 7, and optionally variable capacitor or resistor 9 which vary in accordance with rotation by wheel/dial 11, 37 and/or clicking buttons of device 1. Coordinate input device 1 may also include at least one rotatable side wheel/dial 11, 37 which is adapted to be rotatable by a user during coordinate input operations to vary a graphical or control parameter of an image being drawn on display 13. Dial/wheel 11, 37 may be approximately planar in shape and be approximately parallel with the work surface upon which device 1 is moved. The presence of the tuning circuit in coordinate input device 1 enables the digitizer tablet and the coordinate input device to communicate with one another without being connected (i.e. no cord is necessary). However, it is noted that coordinate input devices according to certain alternative embodiments of this invention may be connected to tablet systems via cords or the like. Additionally, certain embodiments of this invention may be implemented in conventionally mouse input devices, where the mouse is physically maneuvered over a work surface in order to mechanically input coordinate information to a corresponding display system. Thus, this invention may be applicable to digitizer tablet input devices, mouse input devices, cursor input devices, or any other type of input device where gripping of the device is a function of comfort and different handed users may use same.

With regard to digitizer embodiments, digitizer tablet system 3 includes a plurality of conductive loop coils 15 oriented in one direction as shown in FIG. 1. Additionally, in preferred embodiments, another group of loop coils (not shown) is provided in an orthogonal direction relative to loop coils 15 as shown, for example, in U.S. Pat. No. 5,028,745, the disclosure of which is incorporated herein by reference. Electromagnetic waves 17 which are generated by loop coils of tablet 3 are transmitted to the tuning circuit of coordinate input device 1. The tuning circuit in turn resonates and sends back electromagnetic waves 17, which are a function of the variable capacitor(s) and/or resistor(s) in device 1, to loop coils of digitizer tablet 3. Also, it is noted that device 1 includes in certain embodiments a processor, one or two trimmers, and optionally a potentiometer to determine rotational position of thumbwheel 11, 37. It is noted that any other type of communication between device and a work surface may instead by used.

In certain embodiments, the same loop coils may be used to transmit and receive/detect electromagnetic waves 17 to/from the coordinate input device. However, it is also recognized that one set of loop coils may be used to transmit waves 17 to the tuning circuit, and another set of loop coils may be used to receive/detect waves sent from the tuning circuit. Digitizer tablet system 3 further includes receiving circuit 19, transmitting circuit 21, processing device 23, and optionally switching circuit 25. A display (e.g. computer display screen such as an LCD or plasma display panel) 13 is in communication with the digitizer tablet system so that coordinate input device 1 may be manipulated on the tablet system in order to write/draw image data (e.g. pictures, drawings, text, etc. . . . ) on display screen 13.

FIGS. 2–7 illustrate coordinate input device 1 according to this invention. As illustrated in FIGS. 2–7, coordinate input device 1 includes base 31 which is mostly planar in shape, inner shell or housing 33, adjustable and rockable outer shell 35 which rocks relative to inner shell 33 between a left-handed mode position (tilted in one direction) and a right-handed mode position (tilted in the other direction), wheel or dial 37 which is rotatable about central axis 39 and may be rotated by a user to adjust a control or graphical parameter of an image being drawn on display 13, printed circuit board 41 upon which the tuning circuit circuitry shown in FIG. 1 may be mounted, support legs 43 for supporting and affixing inner shell 33 on base 31, biasing springs 45 for biasing outer shell 35 downward toward inner shell 33 in order to bias the outer shell so as to maintain it in the position (e.g. right-handed or left-handed position) where it is being used.

Wheel/dial 37 may be circular in shape about axis 39 in certain embodiments, but alternatively may be only partially circular in shape so as to conserve space within the interior of the inner and outer shells so long as wheel/dial 37 is rotatable about axis 39 to vary select parameter(s) of an image being written/drawn by the user on display 13. Exemplary parameters of an image being drawn that may be adjusted by rotation of wheel/dial 37 include line width, line texture, color, gray level, etc. . . . For example, a line of varying width may be drawn by device 1 on display 13 when the user moves device 1 across the work surface in a line and rotates wheel/dial 37 while drawing the line, with the rotation of the wheel/dial changing the thickness of the line being drawn. Alternatively, rotation of the thumbwheel can be used to zoom in and out of images on the display, scroll up and/or down in a file on the display, navigate (i.e. move) along a third axis, or the like.

Figure 2:
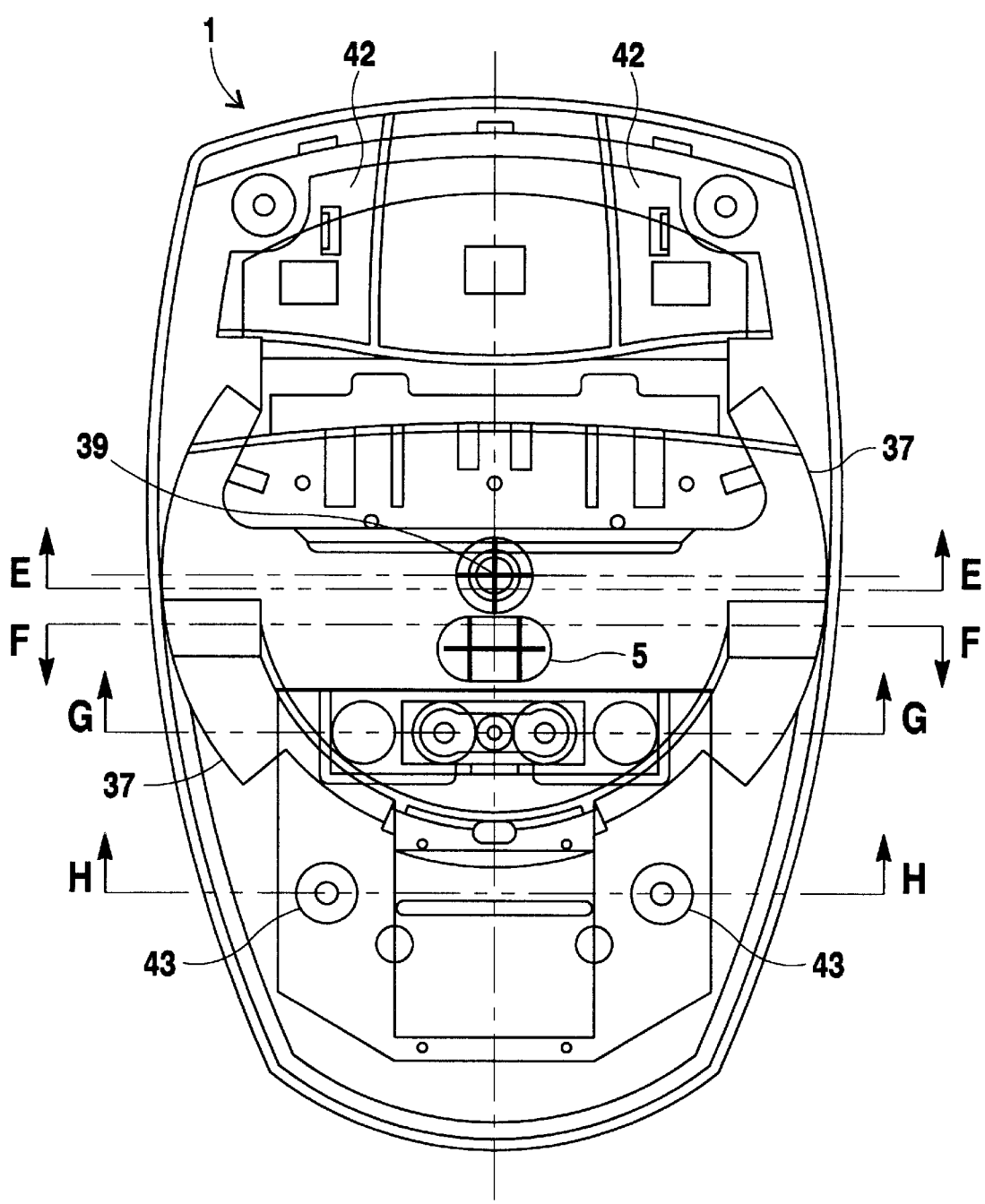
FIG. 2 is a top transparent view of a coordinate input device according to an embodiment of this invention.

Referring to FIG. 2, coil(s) 5 may be located in certain embodiments near the center of the device 1, these coil(s) allowing the device to recognize rotational position of device 1 on the tablet or work surface as well as the overall location of device 1 on the work surface.

Figure 5:
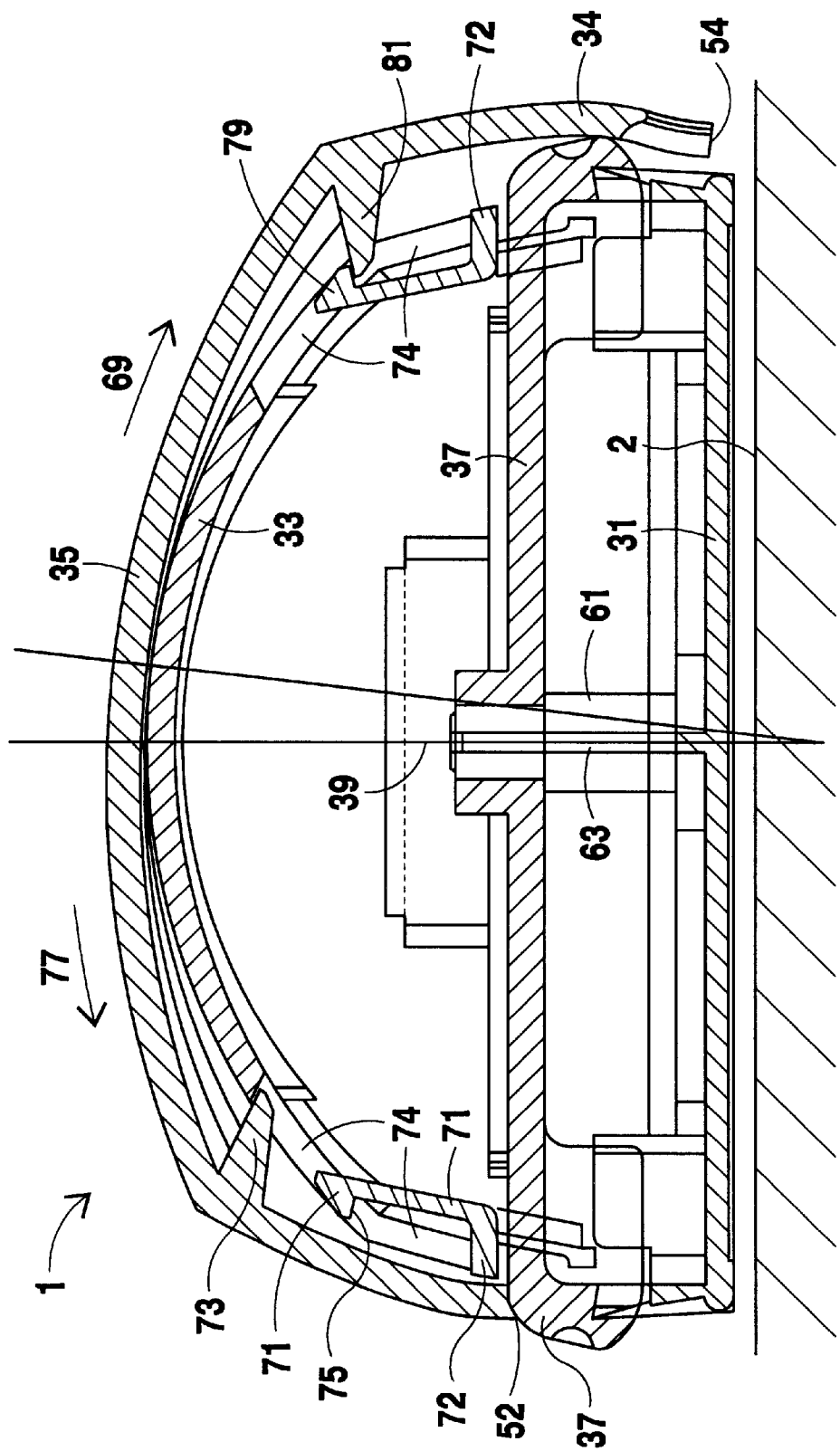
FIG. 5 is a cross-sectional view of the FIG. 2 coordinate input device, taken along section line E—E of FIG. 2.
Figure 6:
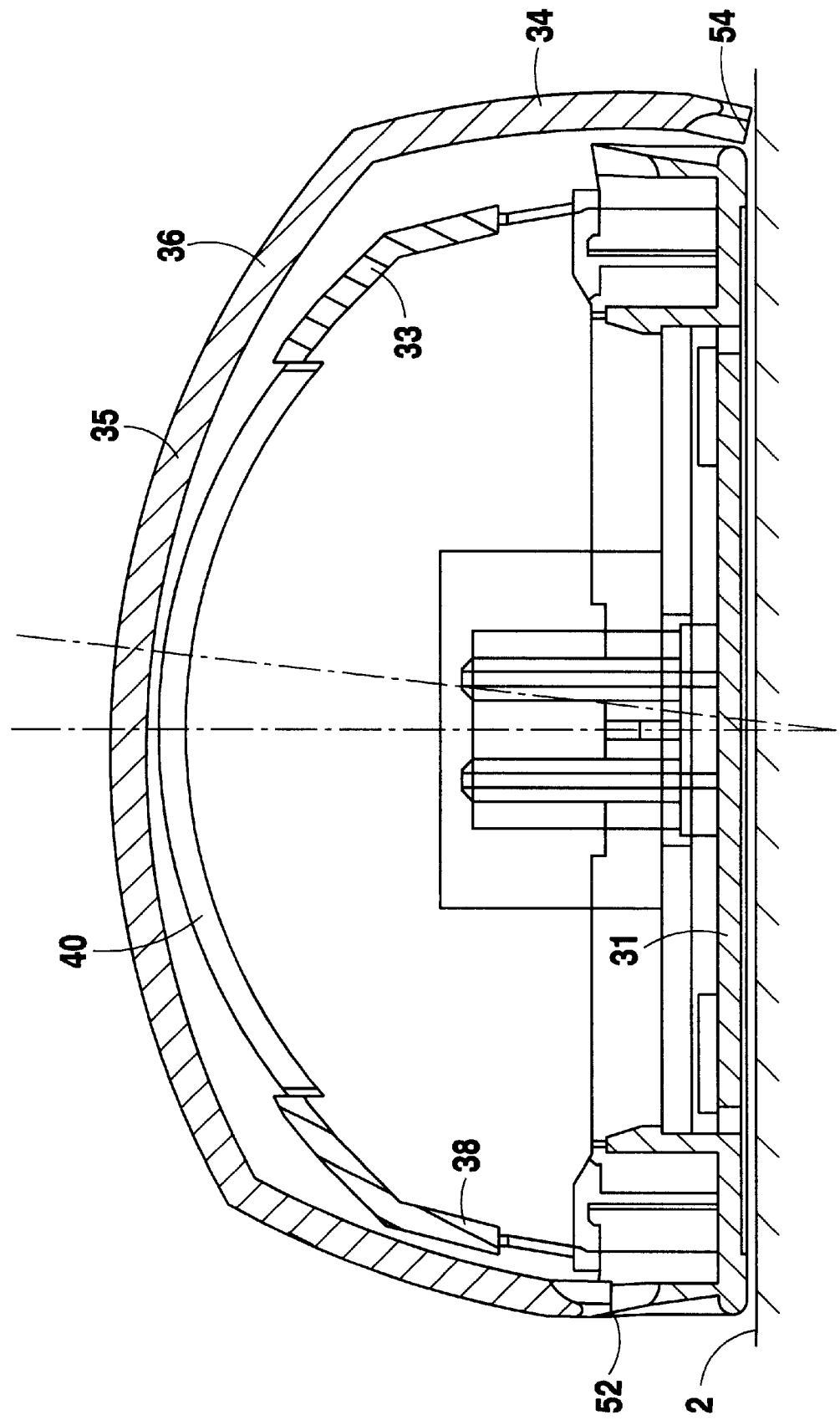
FIG. 6 is a cross sectional view of the FIG. 2 coordinate input device, taken along section line F—F of FIG. 2.
Figure 7:
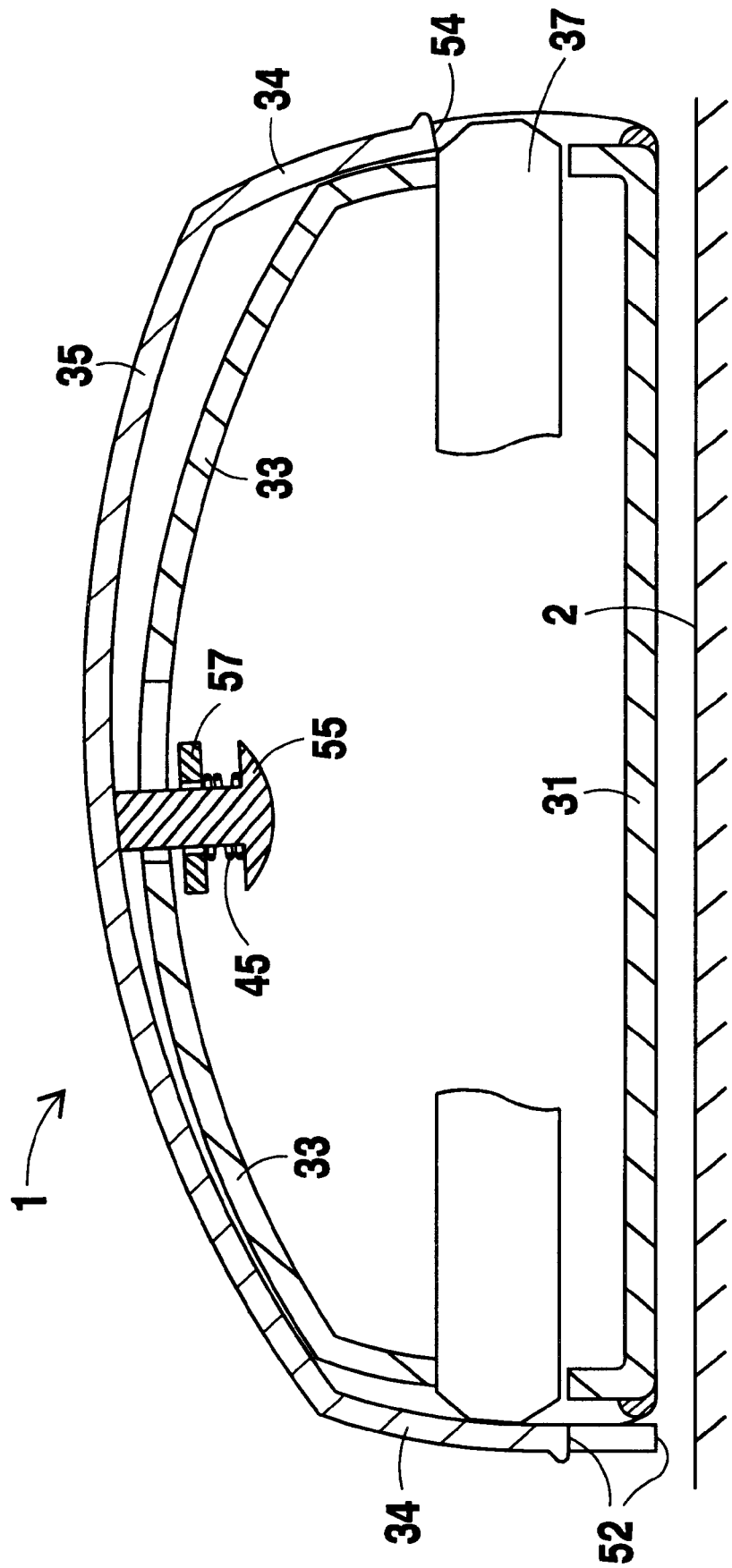
FIG. 7 is a partial cross-sectional view of a coordinate input device according to an embodiment of this invention, which is illustrated slightly differently than the FIGS. 2–6 embodiment.

FIG. 7 shows an embodiment slightly different than the FIG. 2–6 embodiment (only one spring is provided in FIG. 7), with outer housing or shell 35 positioned in the left-handed mode position, where shell 35 is rocked or tilted to the left so that left-handed bottom edge 52 thereof (edge closest to the little finger of the user's left hand) is closer to generally flat or planar work surface 2 upon which device 1 is being manipulated than is right-handed edge 54. Because sidewall 34 of the outer shell is mostly continuous around the periphery of the shell, it has a single lower edge including portions 52 and 54. In other words, when outer shell 35 is rocked to one side, one edge (e.g. 52) is moved closer to the tablet surface, while the opposing edge (e.g. 54) is rocked or moved further from the tablet surface. In order to move outer shell 35 from the left handed position to the right handed position, the user arcuately rotates shell 35 to the right relative to the inner shell and base until edge 54 is closer to work surface 2 than edge 52 (i.e. until housing 35 locks in place in the other tilted direction) and the other side of the thumbwheel 37 is exposed for manipulation by the thumb or index finger of the user's right hand. Thus, wheel 37 is exposed on the side where the user's thumb is to be positioned, and optionally is covered up by the outer housing on the other side.

Spring 45 biases outer shell 35 so that the outer shell is maintained in the FIG. 7 position during left-handed use. Pin 55 is connected to outer shell 35. Spring 45, which is mounted between the head of pin 55 and support washer 57, biases pin 55 inwardly away from inner shell 33 thereby biasing outer shell 35 into contact with or biasing relation toward inner shell 33 so as to maintain outer shell 35 in the FIG. 7 position relative to inner shell 33.

FIGS. 2–6 illustrate outer shell 35 in a "neutral" position (i.e. not in either the right-handed or left-handed position). In FIGS. 2–6, outer shell 35 is positioned between the left-handed and right-handed positioned (i.e. it is not rocked to either side) and edges 52 and 54 are approximately equally space from work surface 2.

Figure 3:
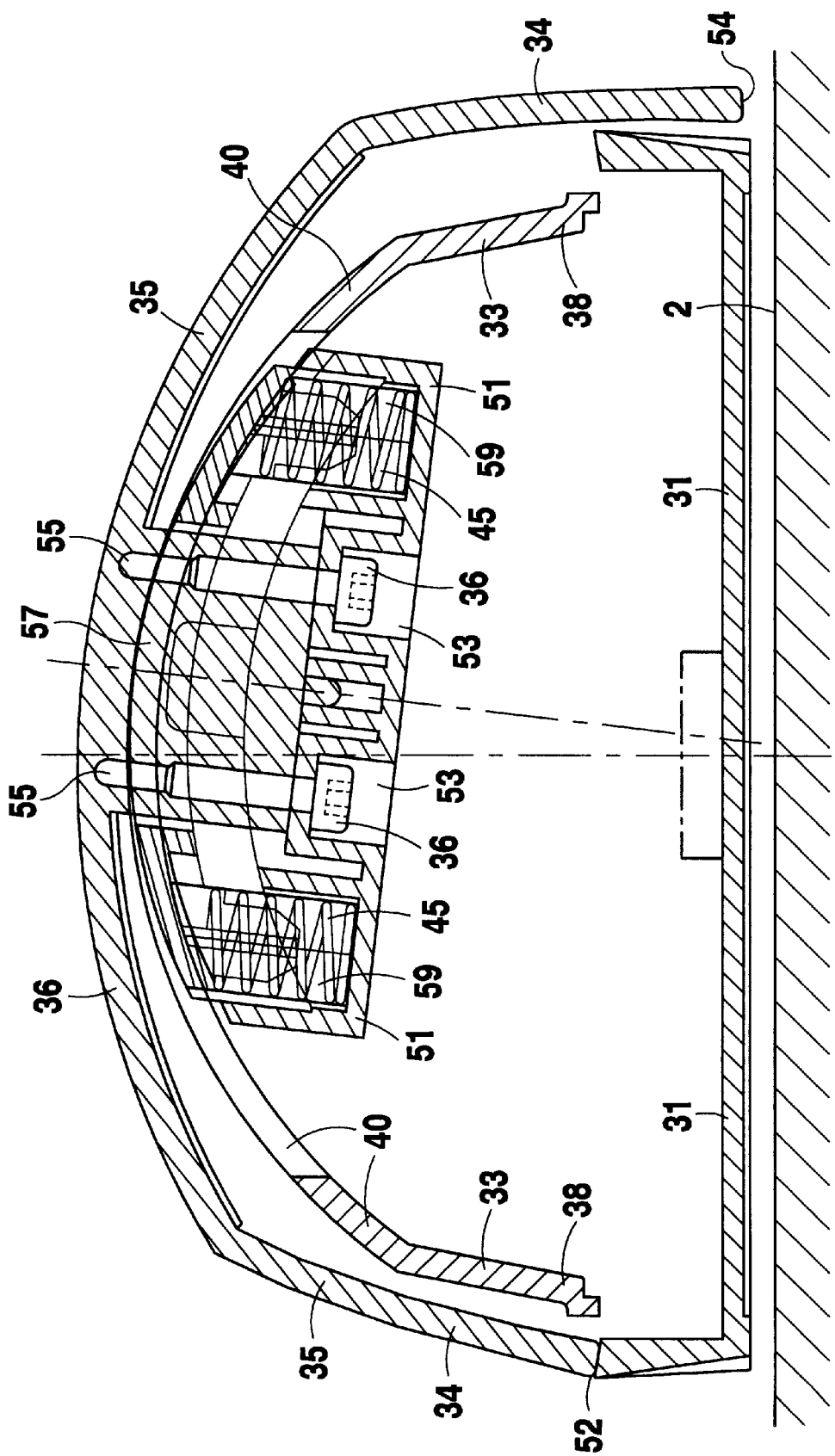
FIG. 3 is a cross-sectional view of the FIG. 2 coordinate input device, taken along section line G—G of FIG. 2.
Figure 8:
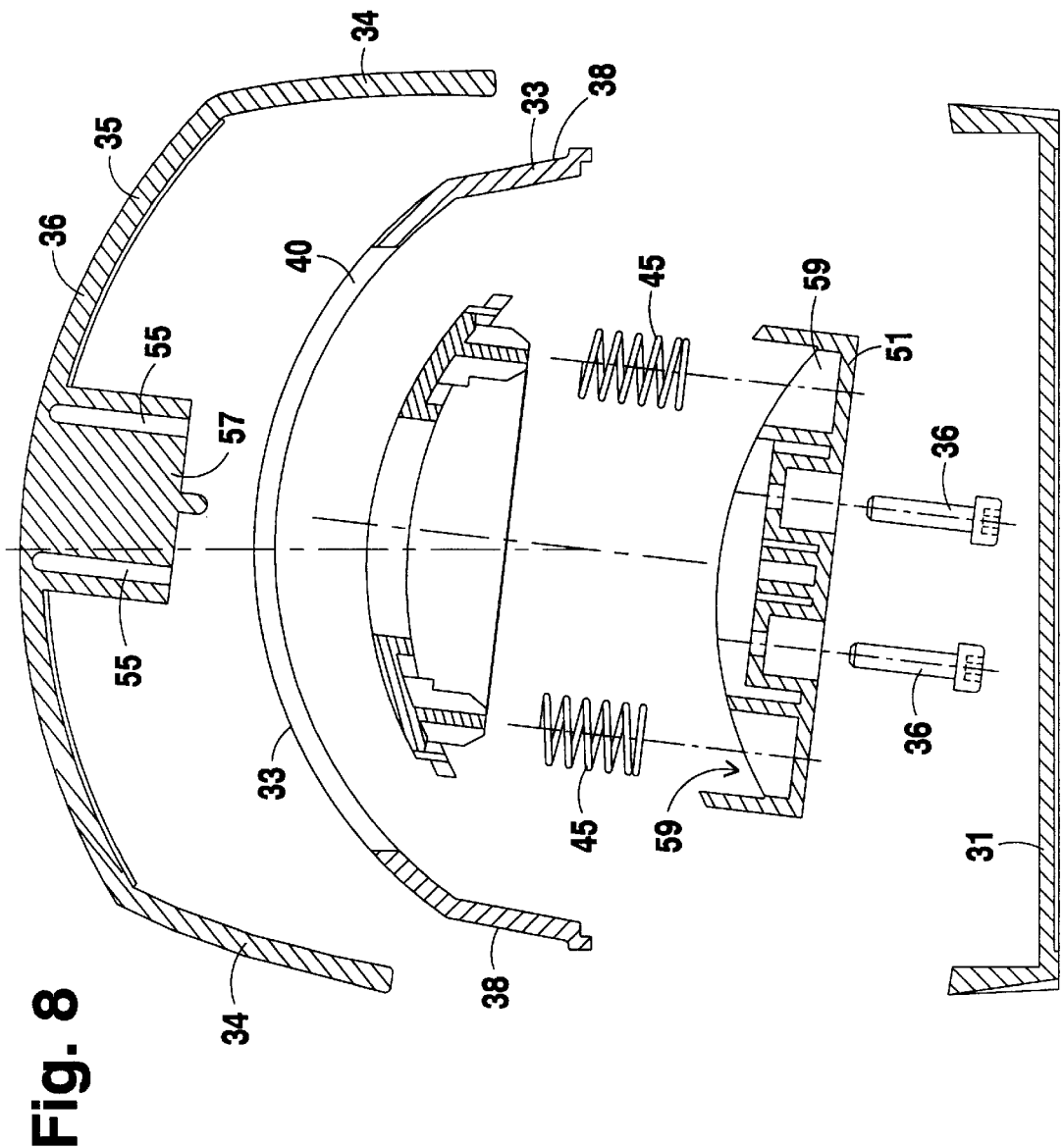
FIG. 8 is an exploded view of the FIG. 3 coordinate input device.

Referring to FIGS. 3 and 8, input device 1 includes spring support member 51 upon which two biasing springs 45 are mounted. Support 51 is mounted and affixed to outer shell 35 by way of fasteners or screws 36 which are mounted in fastener apertures 53 and extend through and threadedly connect with apertures 55 which are defined in the outer shell. Outer shell 35 includes projection(s) 57 which extends inwardly from the inner surface of the outer shell, with projection(s) including apertures 55 defined therein for the purpose of receiving fasteners 36 which affix spring support 51 to projection(s) 57 of the outer shell as shown in FIGS. 3 and 8. Support 51 includes first and second cavities 59 defined therein in which biasing springs 45 are mounted. Springs 45 are positioned so as to bias support 51 and thus outer shell 35 downward relative to inner shell 33 and base 31, this biasing tending to maintain the outer shell against movement relative to inner shell 33 when the outer shell is in either the right or left handed mode position.

Still referring to FIGS. 3 and 8, outer shell 35 is generally U-shaped (i.e. in the shape of an upside down "U"), and includes continuous annular (or oval or rectangular) sidewall portion 34, and arc-shaped or dome-shaped central portion 36 which forms an approximate arc over the inner shell and connects sidewall 34 across the top thereof. Likewise, inner shell 33 is approximately U-shaped (i.e. upside down "U") and includes continuous annular (or oval or rectangular) sidewall portion 38 and arc-shaped or dome-shaped central portion 40 which forms an approximate arc over generally planar base 31 and spans the top edge of the sidewall portion 38. Inner shell 33 is disposed between outer shell 35 and base 31.

Figure 4:
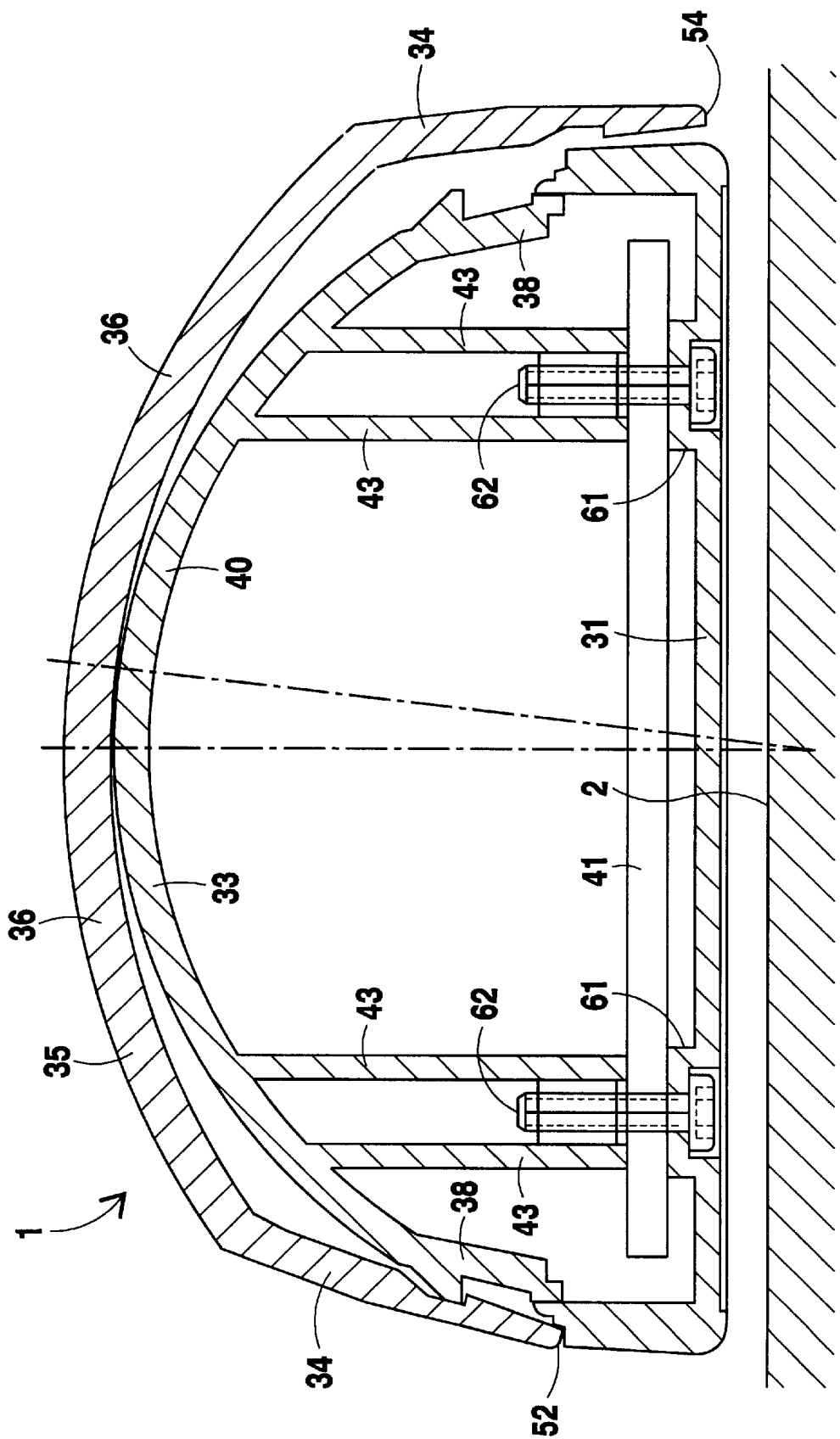
FIG. 4 is a cross-sectional view of the FIG. 2 coordinate input device, taken along section line H—H of FIG. 2.

FIG. 4 (along section line H—H) illustrates printed circuit board (PCB) 41 and supports 43 which are mounted in device. The device in FIG. 4 is shown with the outer shell tilted to the right-handed position. Board 41 may have a plurality of chips and/or other circuitry mounted thereon (e.g. tuning circuit, etc.). Tubular supports 43 are affixed to (e.g. integrally formed with) inner shell 33 and extend downward therefrom so as to rest upon stub-like annular supports 61 that are affixed (e.g. integrally formed with) to base 31.

In certain embodiments, supports 43, base 31, inner shell 33, and outer shell 35 may be made of injection molded plastic or any other suitable material.

In certain embodiments, each annular stub support 61 may include a projection 62 sticking up therefrom which a corresponding tube 43 fits over in order to maintain the tube in position relative to supports 61. In certain embodiments, projections 62 may be screws or the like which extend through base 31 from the bottom thereof, with the elongated portions of the fasteners extending upward into and threadedly connecting with the interior of tubes 43 (i.e. the interior diameter of tubular supports 43 may be threaded). This allows inner shell 33 to be rigidly affixed to base 31, so that only outer shell 35 is moveable relative to base 31.

Typically, as shown in FIGS. 2 and 4, tubular supports 43 and fastening projections 62 provided therein are located close to the rear of the device 1, while circuit board 41 is mounted proximate the front of device underneath mouse clicking input buttons 42 (see FIG. 2). In certain embodiments, device 1 may include two printed circuit boards (PCBs), including a small one that holds button switches and a larger one that hold a potentiometer for determining thumbwheel rotation/movement, a main processor, and other circuitry. The larger board is shown via reference numeral 41, which extends from right behind the buttons to a location near the rear or back of device 1. It is also noted that the PCB for the buttons moves with outer shell 35 to the right and left, while the main PCB is stationary. Buttons, positioned on the top of device 1, enable the user to click with different buttons 42 (e.g. three to ten different buttons may be provided) as is known in the art. Circuitry on board 41 is in communication with buttons 42 to enable device to output signals indicative of clicking by the user on icons or the like. Downward pressing of buttons 42 may cause, for example, contacts to be closed on chips that are mounted within the device on board 41, in order to effect clicking operations.

FIG. 5 is taken along section line E—E in FIG. 2, and illustrates finger actuatable wheel/dial 37 which is rotatable about central fixed axis 39. Referring to FIGS. 5 and 9, wheel 37 is mounted upon fixed central support or spindle 61, with wheel/dial 37 including a central aperture 60 into which support 61 fits. Support/spindle 61 may be annular and include a plurality (e.g. four spaced equally around the center of support 61) of elongated ribs 63 formed therealong.

Latches 71 and 79 are affixed to inner shell 33 (they may be integrally formed therewith of molded plastic in certain embodiments), and may be approximately L-shaped as illustrated in FIGS. 5 and 9. The short portion 72 of each latch 71, 79 extends approximately laterally relative to surface 2 and inwardly from the inner circumference of inner shell 33, while the longer portion of each latch extends upwardly through a corresponding aperture 74 defined in inner shell 33 so as to protrude above the outer periphery of the inner shell so that latches 71, 79 can engage with locking members 73, 81 affixed to outer shell 35.

Outer shell 35 is shown in the right-handed mode position in FIG. 5 (along section line E—E of FIG. 2), and the outer shell is thus not in either the neutral or left-handed mode position. When in the right-handed mode position, the outer shell is rocked or rotated as in FIG. 5 so that wheel/dial 37 is exposed for manipulation by the user's right hand thumb as illustrated in FIG. 5 (i.e. the lower edge 52 of outer shell 35 is moved to an elevation or position above the wheel/dial 37 at a location where the user's right hand thumb is adapted to be positioned.

When, however, outer shell 35 rocks to the left-handed position from either the neutral position or the right-handed mode position, it along with members 73 and 81 rock or arcuately rotate (i.e. slide) in direction 77 relative to stationary inner shell 33 until latch 71 hooks onto and around projection 73. In the left-handed position, edge 54 of the outer shell is moved to an elevation above wheel/dial 37 and edge 52 moves downward to cover up wheel/dial 37 on its side of the device 1. Projection 73 is affixed or integrally formed with outer shell 35 and moves therewith, and extends either downward from the outer shell or inwardly therefrom. Latches 71 and 79 are affixed to the inner shell. When outer shell 35 rocks or moves in direction 77 relative to the inner shell and the base, projection 73 moves downward or arcuately therewith beyond latch 71 until the hook 75 of latch 71 becomes latched onto a tip portion of locking projection 73 so that the outer shell cannot rock back toward the neutral position. In a similar manner, when outer shell is rocked from the neutral position to its right-handed position as shown in FIG. 5, the outer shell rocks or moves in direction 69 relative to inner shell 33 until latch 79 latches onto locking projection 81 which is affixed to and moves with the outer shell. Latch 79 hooking onto projection 81 maintains the outer shell in the right-handed position as per FIG. 5.

When outer shell 35 rocks in either direction 69 or 77, the outer shell is rotating relative to fixed inner shell 33 along an arc approximately defined by the outer diameter of inner shell 33 and/or the inner diameter of the outer shell as illustrated in FIGS. 3–6. The axis or center of the arc is thus also defined approximately at the center of the inner circumference of the outer shell and/or the center of the circumference of the outer periphery of the inner shell. In preferred embodiments of this invention, inner shell 33 remains stationary relative to base 31 when the outer shell is moved to/from the left and right handed mode positions. However, in alternative embodiments, the inner shell may be configured to move relative to the base during such change in modes of device 1.

Once outer shell 35 is in either its left or right handed mode position, and the corresponding latch 71, 79 locked in place with the appropriate locking member 73, 81, the outer shell may be "unlocked" and moved from that position in a number of alternative manners. Firstly, a manual switch may be provided so that the user can unlock the appropriate latch 71, 79 in order to move the outer shell out of the mode position to either a neutral position or to the other handed mode position. Secondly, latches 71, 79 may be unlocked up receiving a predetermined amount of arcuate pressure by the user on the outer shell to move the outer shell out of the locked position toward either a neutral position or the other handed mode position. Thirdly, inward pressure on the exterior of the outer shell by the user may be utilized to unlock or unlatch latches 71, 79. Fourthly, other alternative method of unlocking latches 71, 79 may be utilized to move the outer shell out of left and right handed mode positions.

FIG. 6 illustrates the FIGS. 2–5 mouse like input device 1 along section line F—F of FIG. 2. In this figure, outer shell 35 is shown in the right-handed position.

FIGS. 10(a)–10(e) illustrate thumb wheel/dial 37 from different angles, including its central aperture 60, outer peripheral surface 101 (which may be rubber coated) adapted to be contacted by fingers or thumb of the user, and gear teeth 102 which rotate with wheel/dial 37 in order to rotate or move a corresponding potentiometer (not shown) which detects the degree of rotation of wheel/dial 37. As can be seen in FIGS. 10(a)–10(e), wheel/dial need not have an outer circumference which defines a complete circle, but instead may have an outer circumference which defines only a fraction of a circle. In either event, wheel/dial 37 preferably rotates about a central axis 39.

According to alternative embodiments of this invention, wheel/dial 37 may be replaced with other types of user-actuatable controls such as click buttons, pressure sensors, balls, or the like, one of which may be exposed in the left handed outer shell position and the other in the right handed position. Still further, dial 37 may be replaced with a plurality of different wheels/dials (either noncentering or self-centering types), with one being located on the right side of device 1 and the other on the left side so that one would be for left handed users to manipulate and the other for right handed users to manipulate.

Additionally, device 1 may include a sensor device for automatically detecting settings of the device (including the settings of dial 37, whether the outer housing is in the right or left handed position, click buttons, positional information, etc.), and transmitting data indicative thereof back to e.g. a digitizer tablet and thus to a computer in communication with the system. The information from such a sensor may be used to automatically switch the button function assignment for the buttons, so that button number one (e.g. left click) is always assigned to the button underneath the index finger of the current hand intended to be used given the outer shell position. Additionally, the information from the sensor may be used to interpret thumbwheel data, so that "forward" rotation of the wheel is interpreted the same way in both right and left handed modes, even though they are opposite with regard to clockwise analysis of rotation. The thumbwheel position may be used to provided additional button states: e.g. neutral position, button one reports as button one; thumbwheel backwards—button one becomes button number six; thumbwheel forward—button one becomes button number eleven, etc.

FIGS. 11–17 are side cross sectional views of coordinate input devices 1 according to alternative embodiments of this invention, each of these devices including a moveable or rotatable outer shell 201 rockable, rotatable, and/or moveable relative to a stationary base 202 so that each device has each of a right handed mode position and a different left handed mode position. Each of these embodiments may also have a wheel/dial 37 similar to the embodiments discussed above. In the FIG. 11 embodiment, two-state springs or cartridges 203 are provided between outer shell/housing 201 and base 202. Each 203 has a compressed state and an extended state, and when one is in its compressed state and the other in its extended state, the outer shell 201 is tilted into the corresponding right or left handed mode position. The user can change the state of cartridges/springs 203 simply by applying downward pressure to the shell 201.

In the FIG. 12 embodiment, the user can pull down on projection 205 in either direction in order to adjust the position of outer shell 201 relative to stationary base 202. Spring 206 biases 201 and 202 toward one another, and flexible members 207 limit the distance that the outer shell can move away from the base on each side of the device.

In the FIG. 13 embodiment, support ribs 208, push buttons 209, levers 210, closure biasing spring 211, and limit ribs 212 are provided. The user can press a button 209 upward relative to base 202 to change the position of the outer shell in order to adjust the device 1 between right and left handed mode positions.

In the FIG. 14 embodiment, pivoting lever 213, flexible limiting members 207, lever support rib 214, closure biasing springs 215, and limiting ribs 216 are provided. Pivoting of lever 213 causes the outer shell 201 to be moveable or arcuately rotatable relative to the base between right and left handed mode positions similar to other embodiments of this invention.

The FIG. 15 embodiment includes bar linkages 220 and support ribs 221. Linkages 220 pivot between the corresponding ribs 221 to enable the outer shell/housing 201 to be moved by a user relative to base 202 between left and right handed mode positions.

The FIG. 16 embodiment includes springs 222 in compression, pivotally mounted spring pins 223, spring supports 224, support ribs 225, release levers 226 manipulateable by a user to engage the outer shell 201 in either the right or left handed mode position. Levers 226 have latches 227 which engage with locking members 228. In the illustrated right handed mode, the right handed latch 227 and member 228 are engaged so as to tilt the outer housing toward to right handed users' right hand pinky finger and expose the wheel 37 for thumb contact on the high side of the device 1. To move from the illustrated position, the user moves the right hand lever 226 inward (squeezes it) to release latch 227 and then moves the outer shell to the left handed mode position and releases the left handed lever 226 so that its latch 227 hooks onto and locks with the left handed locking member 228 to maintain the outer shell in the left handed position.

The FIG. 17 embodiment includes a flexible outer shell 201. Ball and socket surfaces 230 engage on one side to maintain the outer shell in either a left handed or right handed mode position. Lips 231 prevent shell 201 from caving downward too much, and portions 232 of shell 201 flex inward and outwardly to slip over base portion(s) 233. FIG. 17 illustrates the device in the right handed position, when viewed from the rear as in FIG. 17. From this position, downward pressing on the left hand side of shell 201 will cause the outer shell to move from the right to the left handed position.

Once given the above disclosure, many other features, modifications, and improvements will become apparent to the skilled artisan. Such other features, modifications, and improvements are therefore considered to be a part of this invention the scope of which is to be determined by the following claims.

We claim:

1. A coordinate input device moveable along a generally horizontal surface in order to input coordinate information to a corresponding computer, the coordinate input device comprising:

a base for movement along the generally horizontal surface;

an inner shell affixed in a non-moving relation to said base, at least a portion of said inner shell generally shaped in an arc above a portion of said base; and an outer shell moveable relative to said inner shell, along an arc, between a left-handed mode position adapted for use by left-handed users and a right-handed mode position adapted for use by right-handed users.

2. The coordinate input device of claim 1, wherein at least a portion of said outer shell is shaped in an arc above a portion of said inner shell so that most of said inner shell is disposed between said outer shell and said base.

3. The coordinate input device of claim 2, wherein said base includes a portion which is substantially planar and approximately parallel to the generally horizontal surface upon which the input device is moved.

4. The coordinate input device of claim 1, further including first and second latches connected to said inner shell, and corresponding first and second locking members connected to said outer shell, and wherein said first latch is operatively connected to said first locking member when the outer shell is in the left handed mode position, and the second latch is not operatively connected to said second locking member when the outer shell is in the left handed mode position; and wherein said second latch is operatively connected to said second locking member and said first latch is not operatively connected to said first locking member when the outer shell is in the right handed mode position.

5. The coordinate input device of claim 4, wherein each of said first and second latches includes a portion which extends generally upward through a corresponding aperture defined in said inner shell.

6. The coordinate input device of claim 1, further comprising first and second elongated tubular supports extending between and connected to said base and said inner shell so as to rigidly connect said inner shell to said base.

7. The coordinate input device of claim 1, further comprising at least one biasing spring for biasing said outer shell toward said inner shell.

8. The coordinate input device of claim 7, wherein said at least one spring is mounted on a support which is rigidly affixed to said outer shell, and wherein said at least one spring is positioned interior of an interior wall of said inner shell.

9. The coordinate input device of claim 1, further including a dial rotatable about a central axis wherein rotation of the dial varies a parameter of an image being written or drawn by the user on a corresponding display screen, said dial adapted to be rotated by a finger or thumb of a user.

10. The coordinate input device of claim 9, wherein said dial is substantially planar and is approximately parallel to a large portion of said base.

11. The coordinate input device of claim 10, wherein said dial is partially circular in shape about its said central axis, and includes an outer periphery coated with a tactile feel material such as rubber.

12. The coordinate input device of claim 9, wherein said dial is mounted on a fixed spindle which extends upwardly from said base.

13. A digitizer tablet upon which the input device of claim 1 is moveable, wherein said generally horizontal surface is part of said digitizer tablet.

14. The coordinate input device of claim 1, further including a tuning circuit for receiving and sending electromagnetic wave signals from and to a corresponding digitizer tablet system.

15. A coordinate input device for movement over a generally flat surface, the coordinate input device comprising:

a generally flat base portion for movement over the generally flat surface; and an adjustable shell for movement relative to said base between a right-handed mode position and a left-handed mode position, wherein said right-handed mode position is adapted for use by right-handed users and said left-handed mode position is adapted for use by left-handed users.

16. The coordinate input device of claim 15, wherein said shell moves along an approximate arc between said right-handed mode position and said left-handed mode position.

17. The coordinate input device of claim 16, wherein said shell can be positioned in a neutral position at the top or peak of said arc when a lower continuous edge of said shell is approximately equally spaced from the generally flat surface around the periphery of the input device.

18. The coordinate input device of claim 15, wherein said input device is approximately mouse-like in shape.

19. A coordinate input device for movement over a generally flat surface, the coordinate input device comprising:

an inner housing which is stationary relative to a base portion of the device;

a finger/thumb wheel or dial rotatable about a central vertically aligned axis;

an outer housing that is moveable relative to said inner housing in order to selectively expose different portions of said wheel or dial so that a first portion of said wheel or dial is exposed for user manipulation when said outer housing is in a first location relative to said inner housing and a second portion of said wheel or dial is exposed for user manipulation when said outer housing is in a second location relative to said inner housing.

* * * * *